June 6, 1939. C. R. H. BONN 2,161,008
CONTROL DEVICE FOR VARIABLE SPEED GEARING
Filed June 10, 1937 8 Sheets-Sheet 3
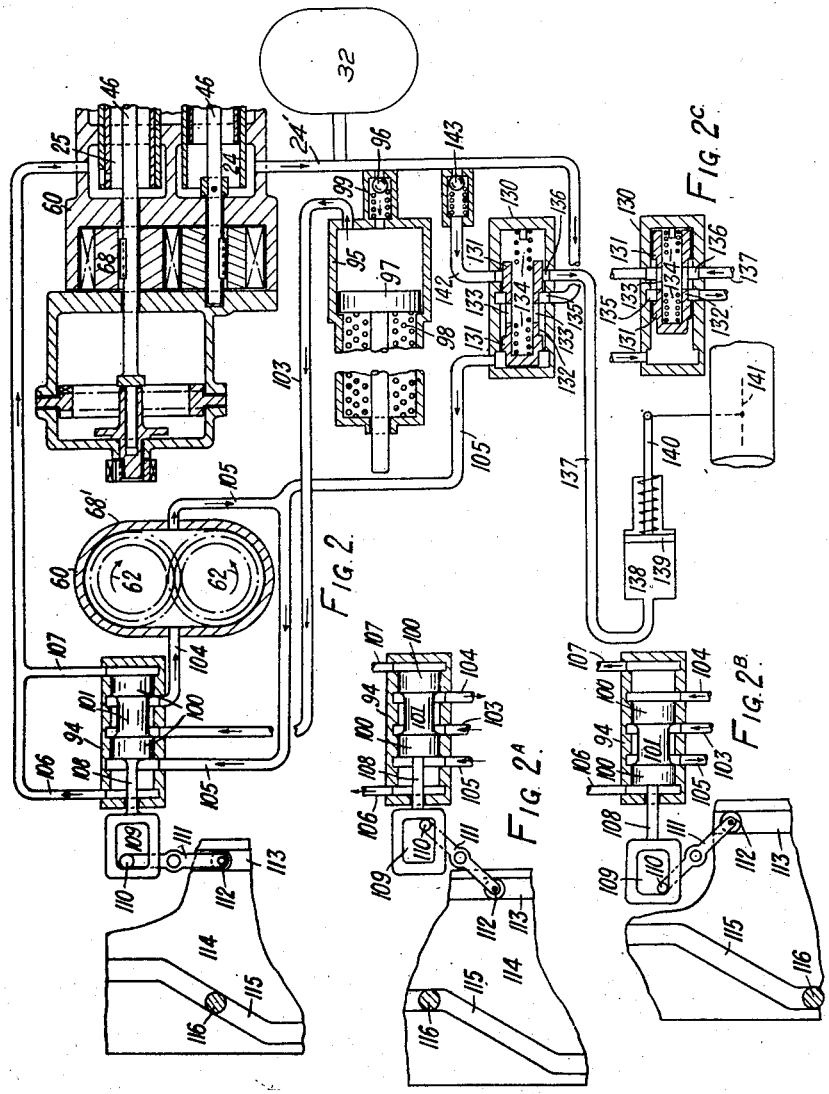

June 6, 1939. C. R. H. BONN 2,161,008
CONTROL DEVICE FOR VARIABLE SPEED GEARING
Filed June 10, 1937 8 Sheets-Sheet 4
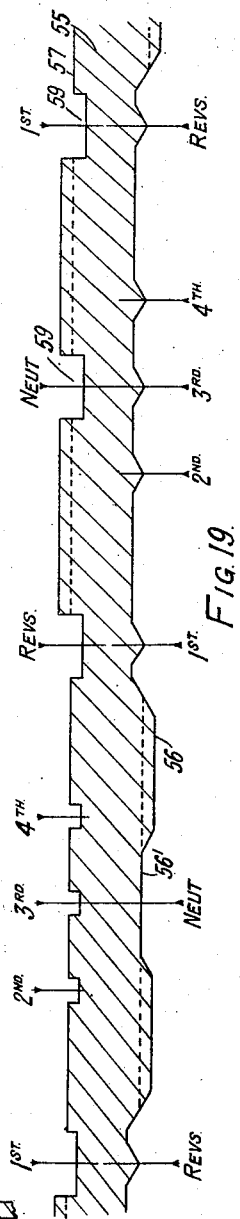
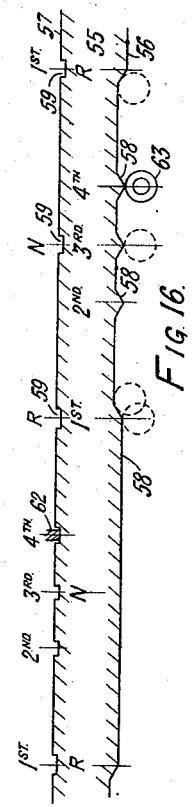
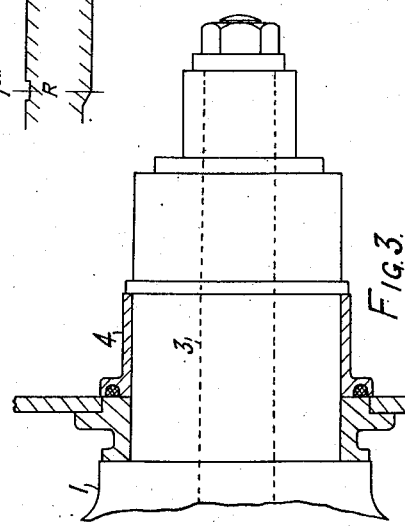

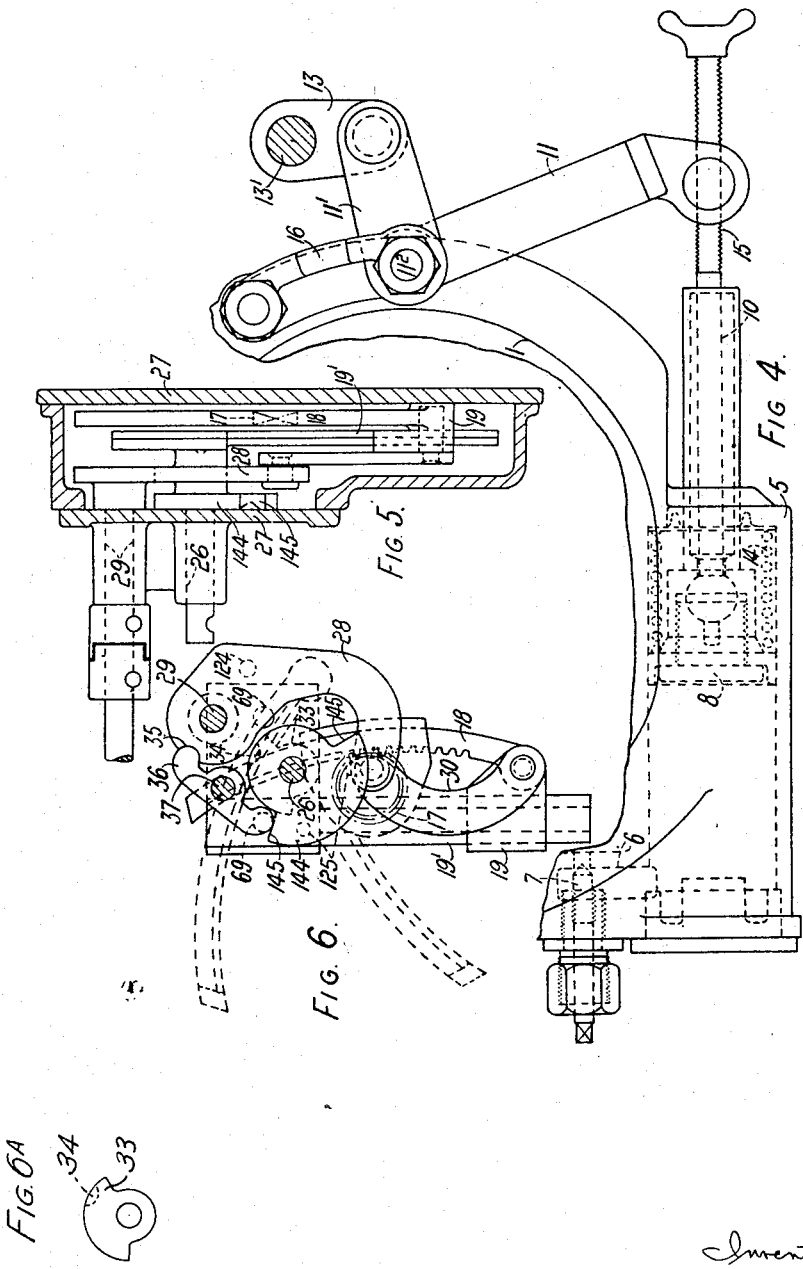

June 6, 1939.  C. R. H. BONN  2,161,008

CONTROL DEVICE FOR VARIABLE SPEED GEARING

Filed June 10, 1937  8 Sheets-Sheet 6

Inventor
Carl Robert Hugo Bonn
By Pennie Davis Marvin Edmonds
Attorneys

June 6, 1939.　　　C. R. H. BONN　　　2,161,008
CONTROL DEVICE FOR VARIABLE SPEED GEARING
Filed June 10, 1937　　　8 Sheets-Sheet 8

Patented June 6, 1939

2,161,008

UNITED STATES PATENT OFFICE 2,161,008

CONTROL DEVICE FOR VARIABLE SPEED GEARING

Carl Robert Hugo Bonn, Glasgow, Scotland

Application June 10, 1937, Serial No. 147,551
In Great Britain June 13, 1936

13 Claims. (Cl. 74—262)

This invention relates to improvements in control devices for variable speed gearing of the type which incorporates a plurality of epicyclic gear trains each of which presents a brake component which is co-operative with a brake component presented or carried by the frame or casing of the gear train assembly, the brakes being adapted to be selectively actuated to effect gear changes.

The invention is particularly applicable to the change speed gearing described and illustrated in my United States Patent No. 2,013,126 and is hereinafter described and illustrated as applied to said change speed gearing.

The epicyclic change speed gearing assembly illustrated by said United States Patent No. 2,013,126 includes a stationary casing, the inner surface of the annular wall of which is of truncated conical formation. The driving shaft of the assembly passes axially into the casing from the end of smaller diameter and extends to nearly the end of larger diameter. The driven shaft of the assembly passes axially into the casing from the end of larger diameter and supports the end of the driving shaft by means of a spigot bearing. The movable components of the brakes of the assembly are constituted by planet-carrier discs, the peripheral surfaces of which are of truncated conical formation corresponding to the formation of the inner surface of the annular wall of the casing. The annular wall of the casing is provided with a plurality of ports, interposed between the discs, through which ports pressure fluid, such as oil under pressure, is admitted to and exhausted from the casing on one side or other of the discs.

Pressure fluid admitted to the casing on the side of larger area of a disc moves said disc axially so that its periphery contacts with the stationary casing whereby the said disc is held against rotation.

Selection of the disc to be moved axially so as to obtain the desired gear ratio is effected by manual operation of inlet and exhaust valves which control the admission and exhaust of pressure fluid through the ports in the annular wall of the casing, the setting or arrangements of ports of the valves being such that when one side of a disc is open to pressure fluid the other side of the disc is open to exhaust.

An object of the present invention is to provide such change speed gearing with control devices whereby a gear speed change may be effected automatically or manually as desired.

Control devices for variable speed gearing as hereinbefore described, according to the present invention, are characterized in that the casing of the assembly of gear trains is mounted for movement against a yielding resistance and co-operates with means adapted to effect selection of the brake to be actuated and thereby effect gear changes automatically. The yielding resistance against which the casing of the assembly of gear trains is adapted partially to rotate may be constituted by a loaded piston operable in a cylinder which together with the casing of the assembly of gear trains, is included in a main pressure fluid circuit, the load on the piston being constituted by the pressure of the fluid in said circuit operable on one side of the piston modified by a spring operable on the other side of the piston.

Conveniently, a connecting rod is arranged between the piston and a stationary frame which supports the partially rotatable casing, the assembly being such that partial rotation of the casing effects axial movement of the cylinder in an arc the center of which is or is about the center of rotation of the said casing and the piston moves correspondingly to maintain the balance between the loadings on the piston.

The partially rotatable casing may carry a bellcrank lever, one limb of which is pivoted to the connecting rod and the other limb of which is pivoted to a link carried by the stationary frame.

The casing carries a pinion, spaced radially from the center of rotation of said casing, whereby partial rotation of the casing effects translation of the pinion in an arc the center of which is or is about the center of rotation of the casing, means being provided for effecting, during translation, rotation of the pinion so as to control the inlet and exhaust valves which control the admission and exhaust of pressure fluid to one side or other of the axially movable discs of the change speed gearing assembly.

The rotation of the pinion may be effected by means including a rack which may be held against endwise movement whereby translation of the pinion effects rotation thereof by tracking the rack.

For manual operation, the rack may be slidably pivoted to an arm adapted to be swung to a position in which the pinion, as it is translated, does not track the rack but rocks the rack idly on its pivot, rotation of the pinion being effected by manually sliding the rack endwise.

Interlocking devices may be provided to prevent automatic operation while manual operation is possible and vice versa.

The inlet and exhaust valves, which are interconnected, are cooperative with devices operable by the pinion for effecting movement of the valves from one valve position to another whereby to effect selection of the brakes. The said devices may include loading means normally urging the valves to a new valve position, locking means which prevent movement of the valves and means for releasing the locking means so as to permit movement of the valves under the influence of the loading means.

The valve loading means may include a motor incorporated in a secondary or telemotor pressure fluid circuit, the motor being co-operative with the valve spindles to effect rotation thereof. The translatable pinion may be associated with a follower adapted to track a cam presenting the various valve positions and co-operative with devices adapted to lock the valve spindles against movement to a new position to which they tend to move under the influence of the load during the period when the follower is tracking the cam between the valve positions and to unlock or release the spindles when a new valve position is reached whereby the valve under the influence of the load, follow up to the new position in which they are locked, the load on the valve being independent of the follower and cam devices and of any movement thereof whereby said devices may move freely between valve position without affecting the load on the valves.

Fig. 1 of the accompanying drawings is a diagram illustrating the main pressure fluid circuit of the control devices of the invention applied to the variable speed gearing described and illustrated in the specification of my United States Patent No. 2,013,126.

Fig. 2 is a diagram illustrating the secondary circuit.

Figs. 2A, 2B, and 2C are fragmentary diagrams to illustrate different positions of valves included in the said secondary circuit.

Fig. 3 is a fragmentary elevation, partly in section, illustrating the bearing for the larger end of the partially rotatable casing, the other and smaller end of the casing being similarly provided with a bearing.

Fig. 4 is a fragmentary end elevation of the casing incorporating an embodiment of the loading device therefor.

Figs. 5 and 6 are respectively corresponding detached elevations at right angles to each other of the mechanism which effects automatic operation of the control devices and permits manual operation, including the interlocking devices thereof. Fig. 6A is an elevation of a disc included in the mechanism shown in Fig. 6 and which will be hereinafter referred to.

Figure 7:
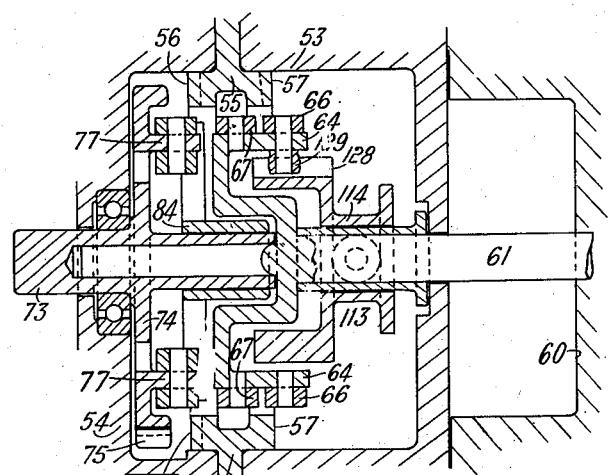
Figure 8:
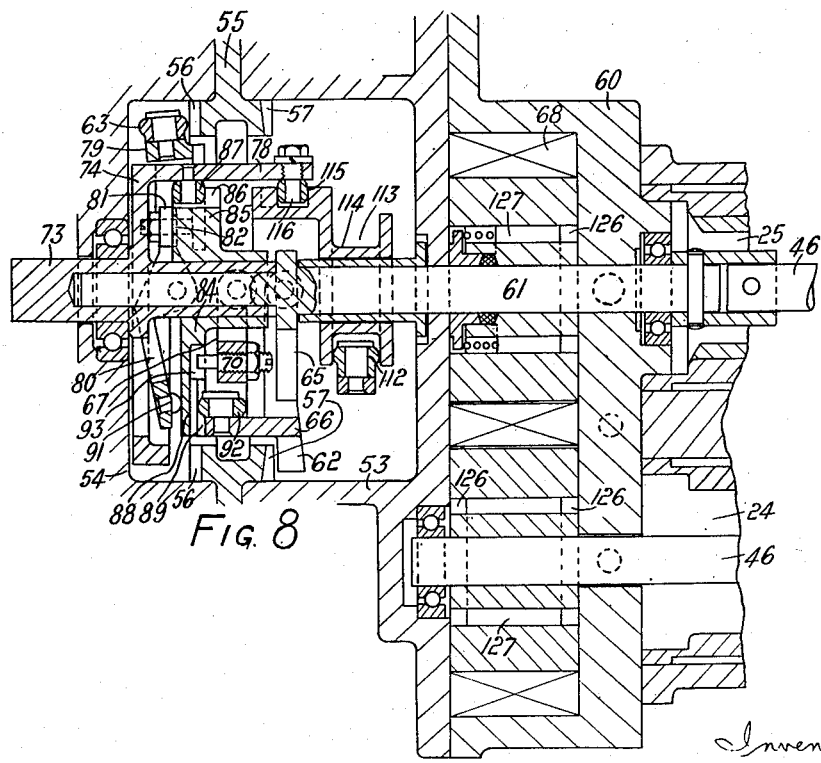
Figure 9:
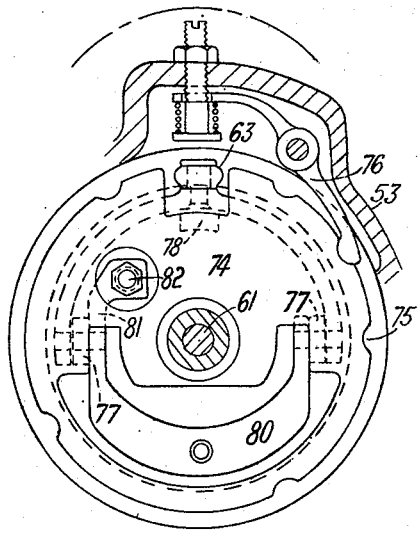
Figure 10:
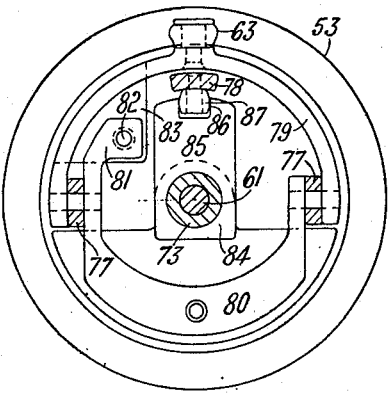

Figs. 7 and 8 are longitudinal elevations at right angles to each other of the load and release devices for the inlet and exhaust valves.

Figs. 9, 10, 11 and 12 are respectively sections taken at different transverse planes of the devices shown by Figs. 7 and 8.

Figure 11:
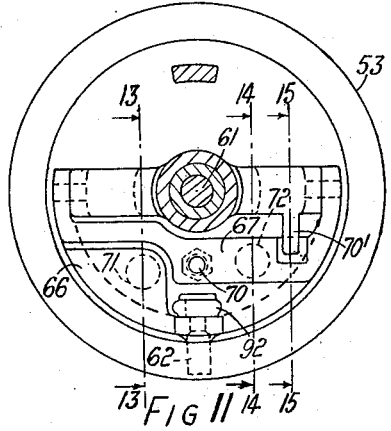
Figure 12:
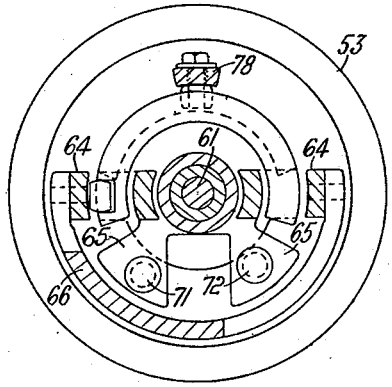
Figure 13:
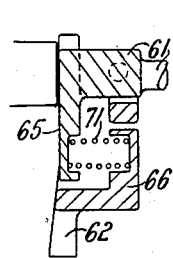
Figure 14:
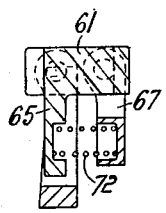
Figure 15:
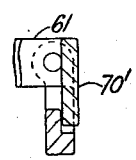

Figs. 13, 14 and 15 are respectively fragmentary sections taken respectively on the lines 13—13, 14—14 and 15—15 of Fig. 11 of details illustrated by Figs. 7 to 12.

Fig. 16 is a diagram illustrating the development of a cam and locking ring hereinafter referred to.

Figure 17:
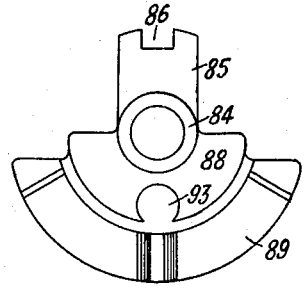
Figure 18:
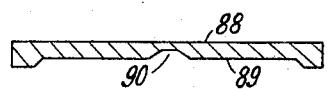

Figs. 17 and 18 illustrate a detail of construction which will be hereinafter referred to.

Figure 20:
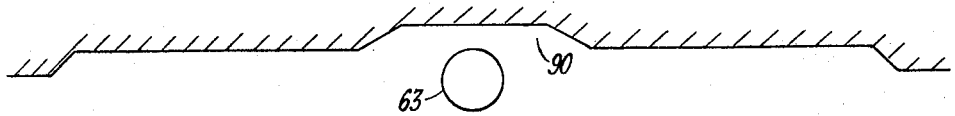
Figure 21:
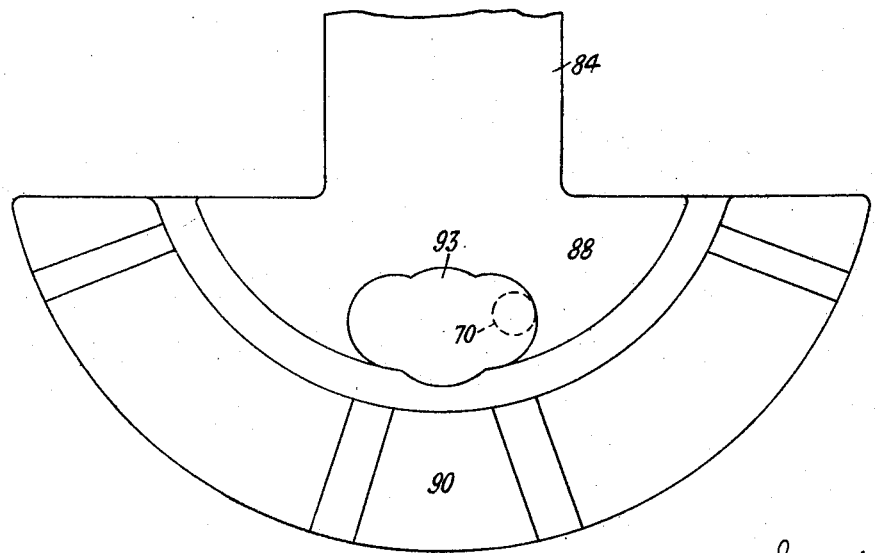

Fig. 19 is a diagram illustrating a modified development of the cam and locking ring illustrated by Fig. 16. Fig. 20 is a diagram illustrating a detail of construction modified to correspond to the modification illustrated by Fig. 19. Fig. 21 is a fragmentary end view of another detail of construction modified to correspond to the modification illustrated by Figs. 19 and 20.

Figure 22:
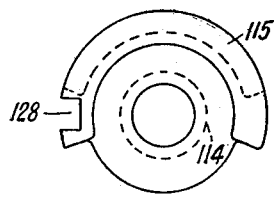
Figure 23:
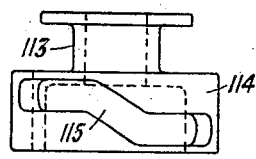

Figs. 22 and 23 are respectively an end view and a corresponding plan view of a detail of construction hereinafter referred to.

Figure 1:
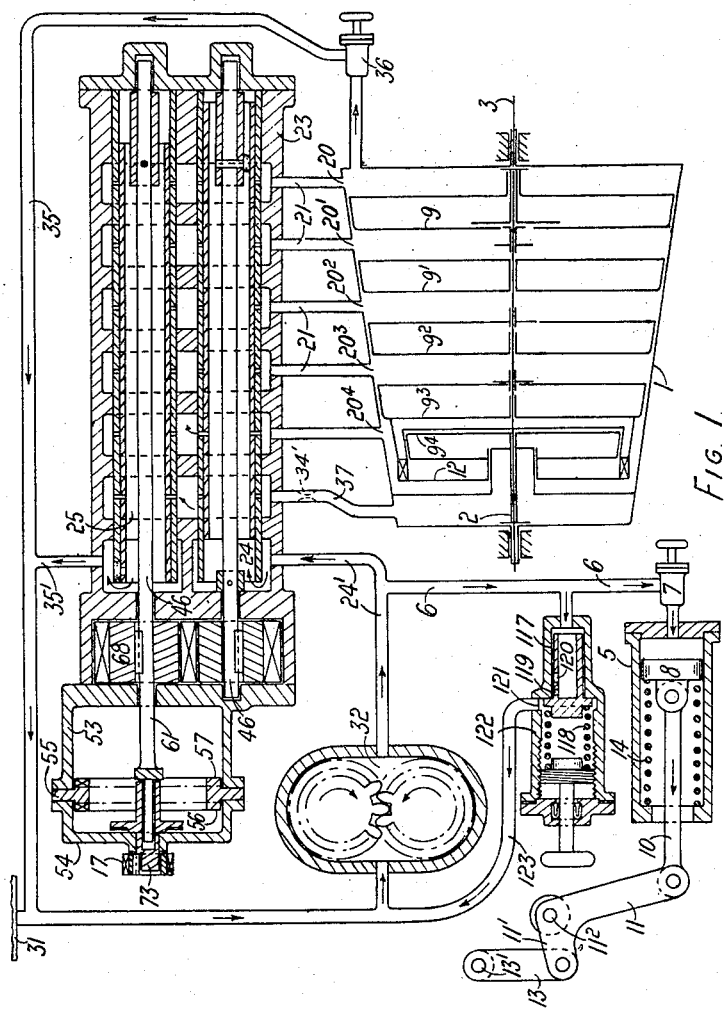
Fig. 1A is a diagrammatic perspective view illustrating the general assembly of the devices of the invention.

As shown by Fig. 1 a casing 1, which encloses the epicyclic gearing assembly to which the invention is particularly applicable, is mounted for rotation about the center of the driving and driven shafts 2 and 3, the bearing 4 for the larger end of the casing 1 being shown by Fig. 3. The epicyclic gearing assembly includes the planet-carrier discs 9, 9', $9^2$, $9^3$, and $9^4$ and the disc 12, the peripheries of which present brake surfaces as described and illustrated in my United States specification No. 2,013,126 aforesaid.

When the brake component presented by the peripheral surface of the disc 9 is in contact with inner surface of the casing 1 the epicyclic gearing is in reverse gear.

When the disc 9' is in contact with the casing 1 the epicyclic gearing is in first gear. When the disc $9^2$ is in contact with the casing 1 the gearing is in second gear. When the disc $9^3$ and the casing 1 are in contact the gearing is in third gear and when the discs $9^4$ and 12 are in contact the gearing is in fourth or top gear.

When all the discs are free the gearing is in neutral.

Figure 1A:
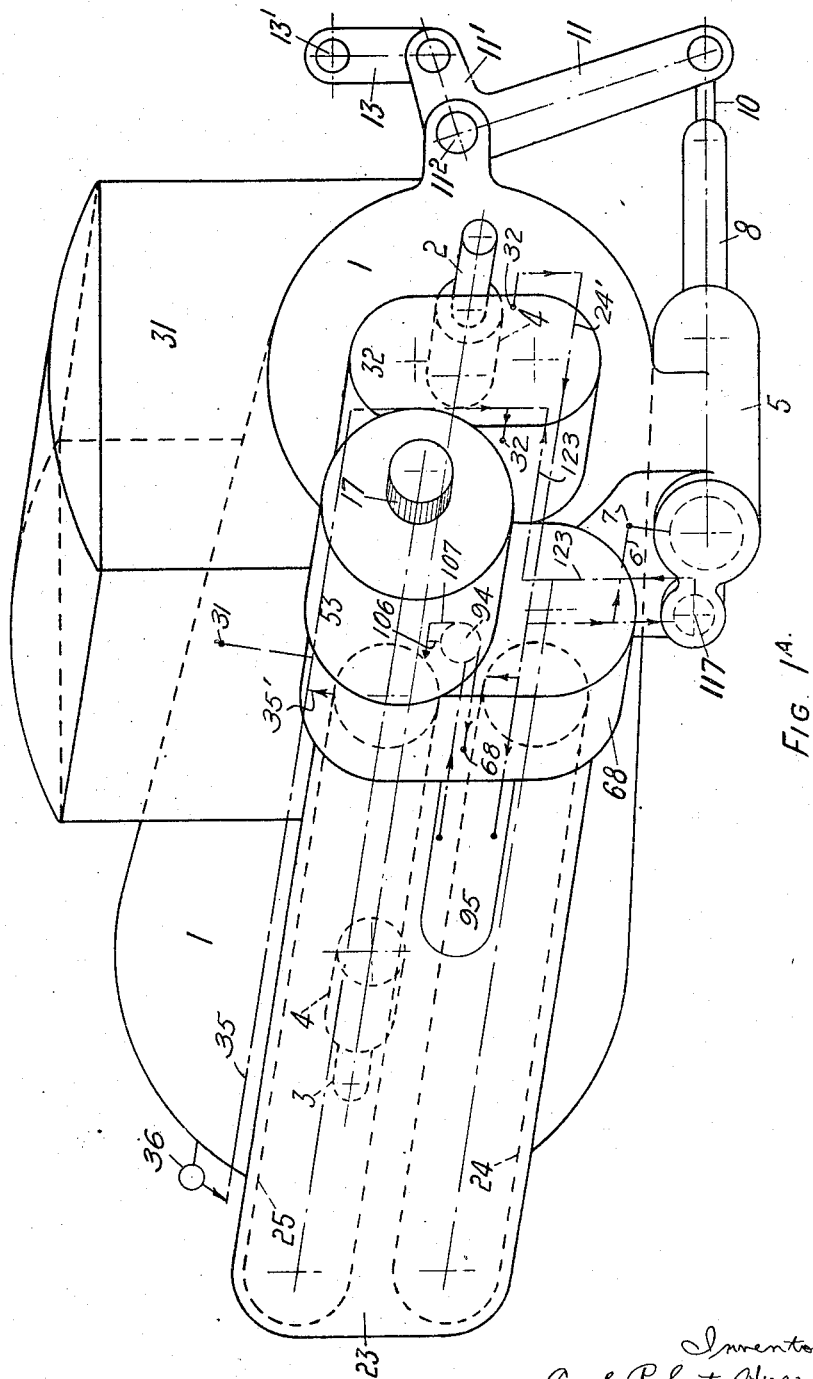

As shown diagrammatically by Fig. 1A the casing 1 carries a tank 31, a pump 32, a cylinder 5, a relief valve 117, the inlet valve 24 and the exhaust valve 25 both mounted within a valve box 23, a motor 68 secured to the valve box 23 and a casing 53 which carries the valve control mechanism including the pinion 17.

The diagram of Fig. 1 shows the valve box 23 separated from the casing 1 and connected thereto by conduits 21. In practice, however, the valve box 23 is bolted to the casing 1 in the position indicated by Fig. 1A and the conduits 21 are constituted by compartments 21 (Fig. 1 of aforesaid United States specification No. 2,013,126) formed in the wall of the casing 1. In practice, the pump 32 is also bolted to the casing 1 and the cylinder 5 and valve 117 are integral with the casing 1.

The assembly of the valve box 23 and the casing is such that each compartment 21 of the casing 1 registers with an inlet port and an exhaust port of the valve box 23.

Although the diagram, Fig. 1, shows the tank 31 and pump 32 separated from the casing 1 it will be readily understood that the tank 31 and pump 32 are carried by the casing 1 as indicated by Fig. 1A and that the piping shown in the diagram (Fig. 1) is constituted by conduits formed in the wall of the casing.

The main pressure fluid circuit includes conduits 6, 24', 35, 35', 37 and 123. The conduit 35 is provided with a constricted throat presenting a nozzle which may have a needle regulating or spring loaded valve 36. The conduit 37 may be provided with a constricted throat 37' presenting a nozzle. The conduit 35 connects the larger end of the casing 1 and the tank 31. The conduit 35' connects the conduit 35 and the exhaust valve 25. The conduit 37 connects the smaller end of the casing 1 and the inlet valve 24. The conduit 24' connects the discharge side of the pump 32 and the inlet valve 24. The conduit 6, which is provided with a nozzle or needle regulating valve 7, connects the conduit 24' and the cylinder 5. The relief valve 117 is connected to the suction side of the pump 32 and the tank 31 by the conduit 123. The relief valve 117 is also connected to the conduit 6.

The secondary or telemotor circuit (Fig. 2) includes a telemotor valve 94, a motor 68, an accumulator 95 which incorporates a non-return valve 96, an automatic decelerator valve 130 and conduits 24', 103, 104, 105, 106, 107, 137 and 142.

The conduits 106 and 107 are connected to each other and connect the ends of the valve 94 with the exhaust valve 25. The conduit 104 connects the valve 94 and one side of the motor 68. The conduit 105 connects the other side of the motor 68 with the valve 94 and with the valve 130. The conduit 103 connects the valve 94 and the accumulator 95. The inlet valve 24 and the accumulator 95 are connected by the conduit 24'. The conduit 24' is also directly connected to the decelerator valve 130. The conduit 24' is also connected to said valve 130 by the conduit 142 provided with a non-return valve 143. The conduit 137 connects the decelerator valve 130 and a cylinder 138 incorporated in devices which control a valve 141 provided in addition to the usual throttle valve of the engine.

In Fig. 1A the conduits of the main and secondary circuits are represented by broken lines, each conduit being indicated by the corresponding reference numeral.

The pressure range of the main pressure fluid circuit includes the conduits from the discharge side of the pump 32, the inlet valve 24 and the portion of the casing 1 on the pressure sides of the discs that is, from the held disc to the larger end of the casing 1. The exhaust range of the main pressure fluid circuit includes the portion of the casing on the exhaust sides of the discs, that is, from the held disc to the smaller end of the casing 1, the exhaust valve 25 and the tank 31.

When all the discs are free and the gearing is in neutral, the pump 32 circulates pressure fluid through the inlet valve 24, conduit 37, the casing 1, the port 20 and the exhaust valve 25 back to the tank 31 so that there is practically no fluid pressure in the casing 1.

The relief valve, which is incorporated in the conduit 6 connected to the conduit 24', includes a valve member 117 loaded by means of a spring 118 and presenting two valve ports 119, 120. When the pressure of the fluid discharged by the pump 32 falls below a predetermined minimum pressure determined by the speed of the pump 32 and the area of the nozzle in the conduit 37 and valve 36, the spring loading 118 maintains closed the valve ports 119, 120. Should the quantity of fluid discharged by the pump 32 cause excessive pressure due to an increase of engine speed, the valve member 117 lifts against the spring loading 118 until the port 119 registers with a port 121 in the valve casing 122 connected to the suction side of the pump 32 by a conduit 123.

The opening of the valve ports 119, 121 maintains the pressure within a small range over a predetermined range of speed. When the predetermined speed is exceeded the valve 117 lifts further so that the port 120 registers with the port 121 and permits the escape of the excess fluid at a pressure, determined by the further movement of the valve, higher than the pressure required to discharge at the lower lift of the valve, thereby acting as a safety valve which prevents an excessive or dangerous pressure at high pump speeds.

The casing 1 is loaded by means later described so as to present a yielding resistance to the tendency to rotate when clutched by the movable brake components presented by one or other of the discs 9, 9', 9$^2$, 9$^3$, or 9$^4$ incorporated in the epicyclic gearing assembly.

The loading device includes the cylinder 5 which is provided with a piston 8.

One end of the cylinder 5, hereinafter termed the recoil cylinder, is connected to the pressure range by the conduit 6. The piston 8 is connected by means of a piston rod 10 to one limb 11 of a bellcrank lever 11, 11' pivotally carried as shown at 11$^2$, by the casing 1. The other limb 11' of the lever is connected to a link 13 pivoted, as shown at 13', to the stationary frame which supports the casing 1. The piston 8 is loaded by a spring 14. The connection between the bellcrank lever 11, 11' and the piston rod 10 may include screw-threads 15 Fig. 4 whereby the compression of the spring 14 may be regulated. A stop 16 Fig. 4 may be provided to limit the rotation of the casing and the movement of the bellcrank lever.

The load presented by the spring 14 and the torque imposed on the casing 1 by the brake in action is balanced by the pressure of the fluid admitted to the cylinder 5.

The cylinder 5, which for convenience is shown in the circuit diagram, Fig. 1, separate from the casing 1, is assembled with its longitudinal axis at right angles to the axis of rotation of the casing 1 as shown by Fig. 1A and is carried by the casing. The assembly is such that when one or other of the movable brake components is in contact with the casing 1, the torque, transmitted to the casing 1, tends to rotate the casing and therefore to move the cylinder 5 axially through an arc the center of which is or is about the center of rotation of the casing. The tendency of the cylinder 5 to move axially is assisted by the spring and resisted by the pressure fluid loading on the piston 8, so that, as the cylinder 5 moves axially, the piston 8 moves correspondingly to maintain the balance between torque and the spring on one hand and pressure fluid loading on the other hand.

The valve control mechanism of the casing 53 which is carried by the valve box 23 incorporates the pinion 17 which is spaced radially from the center of rotation of the casing 1 so that partial rotation of the casing 1, due to the torque and spring overcoming the resistance to rotation presented by the pressure acting on the recoil piston 8, effects a translation of the pinion 17 through an arc the center of which is the center of rotation of the casing 1.

The control devices of the invention may be operated automatically or manually as desired.

When it is desired to operate the control devices manually, the mechanism which effects automatic operation is moved to an inoperative position so as to permit manual operation, interlocking devices being provided to prevent automatic operation while manual operation is possible and vice versa.

The pinion 17 is cooperative with a rack bar 18 the assembly being such that, for automatic operation, the pinion 17 is rotated as it tracks the rack 18 during its translation due to the partial rotation of the casing 1.

The rotation of the pinion 17 effects operation of the inlet and exhaust valves 24 and 25 as hereinafter described so as to effect a change of speed in the epicyclic gearing assembly.

The rack bar 18 is pivotally carried by a slipper 19 slidably mounted on an arm 19' secured on a spindle 26 carried by a frame 27 secured to the stationary frame which supports the casing 1.

Partial rotation of the spindle 26 is effected manually by suitable means.

When it is desired to permit manual operation of the control devices (the valves 24 and 25) the spindle 26 and therefore the arm 19' are partially rotated so as to swing the pivot of the rack bar 18 from the automatic position shown by full lines to the manual positions shown by dotted lines in Fig. 6. When the pivot of the bar 18 is swung to the dotted position, the bar 18 rocks idly between the two dotted positions as the pinion 17 moves through the various valve positions under manual control.

When the bar 18 is in the automatic position and there is no pressure in the casing 1 the pinion 17 is in the 1st speed position. When the bar 18 is in the automatic position and there is pressure in the casing 1 the torque on the casing 1 assisted by the spring 14 balances the pressure on the piston 8 and determines the position of the pinion 17 on the rack 18 and therefore the gear which is in. When the bar 18 is moved from the automatic position to the manual position the pinion 17 is rotated to the neutral position irrespective of the pressure in the casing.

The slipper 19 or the bar 18 is manually movable so as to swing the pivot of the bar 18 from the position shown in full lines to the positions shown in dotted lines and vice versa.

When the bar 18 is in the position for manual operation the slipper 19 is slid on the arm 19' whereby rotation of the pinion 17 is effected by means of the rack bar 18.

The interlocking devices include a lever 28 secured on a spindle 29 carried by the frame 27. Partial rotation of the spindle 29 is effected manually by suitable means. The lever 28 is connected to the slipper 19 by means of a link 30. A disc member 144 presenting stops 145 and a disc member 33 (Fig. 6A) presenting a notch 34 are secured on the spindle 26. The stops 145 are cooperative with stop pins 69 secured to the frame 27 so as to limit the rotary movement of the spindle 26. The side face of the lever 28 adjacent to the frame 27 may be formed with a recess or indentation adapted to be engaged by a spring-urged pin 124 when the lever 28 is in the neutral position of the gears. The side face of the disc 144 adjacent to the frame 27 is formed with spaced recesses or indentations adapted to be engaged by a spring-urged pin 125 when the disc 144 is in the manual or automatic positions. The boss part of the lever 28 presents a notch 35. A locking lever 36, adapted to rock on its pivot 37, is assembled so as to engage in one or other of the notches 34 or 35.

It will be observed that, in the automatic position, the one end of the locking lever 36 is engaged in the notch 35, and the other end of the locking lever 36 is not in register with the notch 34, so that the arm 28 and the spindle 29 are locked against rotation thereby locking the hand-lever mechanism operatively connected to the spindle 29. When the arm 28 is locked, the slipper 19 is locked against sliding on the arm 19' so that the pinion 17, which is in gear with the rack bar 18, cannot be rotated manually by the hand-lever mechanism operatively connected to the slipper 19 or rack bar 18 but is rotated by tracking the rack.

When it is desired to change over from automatic control to manual control, the spindle 26 is manually rotated by means of the hand-lever mechanism operatively connected thereto. During the swinging movement of the arm 19' the arm 28 remains locked, until the notch 34 registers with the associated end of the locking lever 36. When the arm 28 has reached the manual position the notch 34 registers with the end of the lever 36 and the arm 28 may be swung by means of the hand-lever mechanism operatively connected to the spindle 29, the lever 36 swinging on its pivot 37 so that the one end of said lever is moved out of the notch 35 and the other end of said lever is moved into the notch 34 thereby locking the spindle 26 and the hand-lever mechanism operatively connected thereto so that the arm 19' cannot be swung back again to the automatic position until the arm 28 is swung back to the neutral position in which the notch 35 registers with the end of the locking lever 36.

The inlet and exhaust valves 24 and 25 may be constituted by two ported valve members geared together and assembled somewhat as described and shown in my aforesaid prior specification No. 2,013,126. The pinion 17 is secured on a sleeve mounted on the spindle of one of the valve members. As the pinion 17 is rotated either manually or automatically the ports of the valve members register as desired with the conduits or compartments 21.

Figs. 7 to 16 illustrate load and release devices which, on rotation of the pinion 17, control the rotary movement of the valve spindles 46 so as to effect registration of the valve ports in accordance with the speeds of the epicyclic gearing assembly.

As shown by Fig. 8 the spindles 46 of the inlet and exhaust valves 24 and 25 are geared together by gear wheels 68 enclosed within a casing 60 and constituting a pressure fluid motor. Desirably and as shown, one of the gear wheels 68 is secured on a spindle 61 coupled to the spindle of the exhaust valve 25 and the other gear wheel 68 is secured on the spindle of the inlet valve 24.

Desirably the side faces of the gear wheels 68 are provided with annular grooves 126 connected by passages 127 so as to balance the pressure on both sides of the gear wheels and prevent axial thrust.

In the circuit diagram, Fig. 2, for convenience in illustrating the secondary or telemotor circuit, the motor 68 is shown twice, in longitudinal section (68) and in transverse section (68'). Pressure fluid admitted to one side of the casing 60 effects rotation of the gear wheels 68 in the direction indicated by the arrows 62. When the flow of pressure fluid is reversed the direction of rotation of the gear wheels 68 is reversed.

It will be observed that the motor 68 transmits a load to the valve spindles 46 which tends to rotate said spindles in one direction or the other.

The load and release devices (Figs. 7 to 16) are enclosed within a casing 53 between which and the cover plate 54 thereof there is interposed a ring member 55, the side faces of which present respectively a cam face 56 and a locking face 57. The cam face 56, Fig. 16, presents projections 58 and the locking face 57 presents notches 59, said projections and notches being spaced to correspond to the various valve port positions or speeds of the epicyclic gearing assembly.

According to the embodiment illustrated by Fig. 16, the notches 59 marked "1st", "2nd", "3rd", "4th", "N" and "R" of the locking face 57 correspond respectively to the first speed, second speed, third speed, top or fourth speed, neutral and reverse positions of the gears.

A locking pin or tooth 62 is indicated in the "4th" speed notch, the valves being in the top gear position.

The projections 58 of the cam face 56 marked "1st", "2nd", "3rd", "4th" "neutral" and "reverse" correspond respectively to the first speed, second speed, third speed, top or fourth speed, neutral and reverse positions of the gear.

A runner 63 which tracks the cam face 56 is shown opposite the "4th" speed projection, the valves being in top speed position.

The projections 58 are spaced 180° angularly from the locking notches 59.

The spindle 61 is formed with a bracket presenting two pairs of lugs 64 and 65 respectively. The pair of lugs 64 are spaced laterally one on each side of the spindle 61 and extend parallel to said spindle 61. The other pair of lugs 65 are spaced apart angularly and extend radially to the spindle 61. Spring-urged hanging members 66 and 67 respectively are pivotally suspended from the lugs 64. The member 66 is provided with the tooth or key 62 which engages the notches 59 of the locking face 57. The member 67 carries a "pick-up" pin 70 hereinafter referred to. A spring 71 interposed between the member 66 and one of the lugs 65 urges the tooth 62 into engagement with the corresponding notch 59 and a spring 72 is interposed between the member 67 and the other lug 65.

It will be observed that when the tooth 62 is engaged in one of the notches 59 of the locking face 57 the spindle 61 and therefore the valve spindles 46 are held against rotation, that is, against the load or force exerted by the motor 68 which tends to rotate the spindle 61.

The pinion 17 is secured on a sleeve 73 mounted for rotation on the spindle 61 and formed integrally with a disc 74, the rim of which is provided with a plurality of notches 75 spaced angularly to correspond to the various speed positions. A spring-urged detent 76 is adapted to engage in one or other of the notches 75. The disc 74 is provided with a pair of lugs 77 spaced laterally, one on each side of the sleeve 73 and parallel thereto. The disc is also provided with a flange 78 which is located angularly intermediate the lugs 77 and extends parallel to the sleeve 73. A bridge member 79 pivoted to the lugs 77 carries the runner 63 which tracks the cam face 56. A hanging member 80 pivotally suspended to the lugs 77 is formed with an extension 81 which carries a pin 82 adapted to press against a flange 83 presented by the bridge member 79. A sleeve 84 axially slidable on the sleeve 73 presents a radial flange 85 provided with a rim groove or slot 86 in which is located a runner 87 carried by the flange 78 of the disc 74. The sleeve 84 presents also a radial flange 88 which, on one side, is formed with a recess 93 and with a cam surface 89 which includes a recess 90. The spring 72 urges the "pick-up" pin 70 into engagement with the recess 93. The cam surface 89 is adapted to be tracked by a runner 92 carried by the spring-urged hanging member 66. The other side of the flange 88 is adapted to be engaged by a pin 91 carried by the hanging member 80.

When the inlet and exhaust valves 24 and 25 are in register for a speed position, say the "4th" or top speed, the runner 63 is at the apex of the cam projection 58 marked "4th", the tooth 62 is in engagement with the locking notch 59 marked "4th", the runner 92 is in the recess 90, the pick-up pin 70 is in the recess 93 and the detent 76 is in engagement with the notch 75 which corresponds to the "4th" speed position.

Rotary motion imparted to the pinion 17 effects angular movement of the disc 74 and therefore of the bridge member 79 and hanging member 80 carried thereby and also, by means of the runner 87 and groove 86, of the sleeve 84. Immediately the runner 63 leaves the apex of the cooperative cam projection 58 the bridge member 79 rocks on its pivot and thereby rocks the hanging member 80 so that the pin 91 moves away from the flange 88 of the axially slidable sleeve 84.

The angular movement of the flange 88 causes the inclined end face of the notch 90 to mount the runner 92 and effect axial sliding movement of the flange 88 to follow the pin 91. The runner 92, which is locked by engagement of the tooth 62 in the locking notch 59, tracks the cam surface 89. The axial movement of the flange 88 disengages the recess 93 from the pick-up pin 70 which under the influence of the spring 72 tracks the surface of the flange 88 and applies a drag to the angular movement of said flange.

A stop 70' presented by the bracket constituted by the lugs 64, 65, is provided to limit the forward movement of the pin 70 under the influence of the spring 72.

When the runner 63 reaches the next speed position, the "3rd" speed position, the bridge member 79 and hanging member 80 are rocked whereby the pin 91 slides the flange 88 and sleeve 84 axially. The cam surface 89 by pressing on the runner 92 swings the member 66 against the force exerted by the spring 71 and thereby moves the tooth 62 out of engagement with the notch 59. Immediately the tooth 62 is clear of the notch 59 the spindle 61 is released and therefore the hanging members 66 and 67 are rotated by the motor 68 until the runner 92 registers with the recess 90 and the pick-up pin 70 registers with the recess 93. In the "Neut.", "Revs." and "1st" speed positions the line of movement of the tooth 62 relative to the corresponding notches 59 may vary slightly, due to the setting of the valve ports for these positions, so that, as shown by Fig. 19 the notches marked respectively, "1st", "Neut." and "Revs." are wider than the other notches. On both sides of the neutral notch, that is, between "Neut." and "Revs." and between "Neut." and "1st" the surface of the locking face 57 is raised. Similarly the surface of the cam face 56 on both sides of the "Neut.' projection, that is, between "Neut." and "Revs." and between "Neut." and "1st", is raised by a corresponding amount.

The recess 90 as illustrated by Figs. 20 and 21 is wider, so as to correspond to the wider notches 59, than the recess 90 illustrated by Fig. 16 but is not deeper.

In the free or neutral position fluid is circulated by the pump through neutral valve ports back to the tank 31 and pump suction, that is, the fluid is short circuited, the valve ports corresponding to the speed positions being closed. The pressure of the fluid thus short circuited is at a minimum pressure which is less than the working pressure.

As described in aforesaid specification No. 2,013,126, the fluid, when in the free or neutral position, is also circulated by the pump, at a minimum pressure which is less than the working pressure, through the casing 1 and conduit 35 back to the tank 31 whereby the discs 9 to 9⁴ are moved to the disengaged or free position.

As shown by Fig. 19 the surface 56' at the "Neut." position between the raised surfaces 56 is in the same plane as the apices of the projections marked "1st", "2nd", "3rd", "4th" and "Revs." When the runner 63 is contacting with the surface 56' and also when it is passing from the surface 56 on one side of the "Neut." position through the "1st", "2nd", "3rd", "4th" and "Revs." positions to the surface 56 on the other side of the "Neut." position, the pick-up pin 70 is not in the recess 93 nor in contact with the flange 88. The pick-up pin 70 only engages in the recess 93 when the roller 62 tracks the surface 56. The purpose of the pick-up pin 70 is to effect closure of the neutral valve ports and thereby stop the short circuiting of the fluid.

When the runner 63 mounts the raised surfaces 56 after leaving the neutral position the hanging member 80 moves axially by a corresponding amount the sleeve 84 carrying the flange 88 provided with the pick-up pin recess 93 whereby the pin 70 engages in the recess 93. When the tooth 62 is disengaged by the runner 92 mounting the sides of the recess 90, the pick-up pin 70 is not disengaged from the recess 93 but is carried round by the flange 88 and thereby rotates the spindle 61 so as to close the neutral valve ports. Closure of the neutral valve ports stops the aforesaid short circuiting of the fluid so that a rise of pressure in the fluid pressure circuit is effected.

As shown by Fig. 2, the secondary or telemotor circuit includes a telemotor valve 94 adapted to control the direction of flow of the pressure fluid through the motor 68 and therefore the direction of rotation of the motor.

For the period during which a gear change is being effected, that is, when the brake surface of a disc is moving out of contact with its co-operative brake surface and the brake surface of another disc is moving into contact with its cooperative brake surface, the pressure of the fluid in the casing 1 falls. When the pressure of the fluid in the casing 1 falls the pump 32 circulates the fluid through the inlet and exhaust valves 24 and 25 from the pressure to the exhaust ranges.

In order that the pressure of the fluid in the secondary or telemotor circuit may be maintained when the pressure of the fluid in the casing 1 falls, the said secondary circuit includes an accumulator 95 incorporating a non-return valve 96.

The accumulator may be constituted by a cylinder 95 provided with a piston 97 loaded by means of a spring 98. The non-return valve may be constituted by a ball 96 loaded by means of a spring 99.

The telemotor valve may include a valve casing 94 provided with an axially slidable valve incorporating two spaced pistons 100 connected by a neck 101. The inlet valve 24 is connected to the accumulator 95 by a conduit 102 which incorporates the non-return valve 96. The valve casing 94 is connected to the accumulator 95 by a conduit 103 and to opposite sides of the motor 68 by conduits 104 and 105 respectively. The valve casing 94 is also connected to the exhaust valve 25 by conduits 106 and 107 respectively.

Normally the pressure of the fluid in the pressure range, including the inlet valve 24, maintains the accumulator 95 fully charged with fluid under pressure. When the pressure of the fluid in the pressure range falls the spring loading 98 on the piston 97 maintains the pressure in the secondary circuit and closes the non-return valve 96.

When the valve 94 is in the position shown by Fig. 2 pressure fluid from the accumulator 95 passes through the conduit 103 into the chamber in the valve casing 94 around the neck 101 and is discharged from said chamber to the motor 68 through the conduit 104. The motor 68 is thereby under pressure and tends to rotate in the direction indicated by the arrows 62. The other side of the motor 68 is open to the exhaust range through the conduit 105, one end of the valve casing 94, the conduit 106 and the exhaust valve 25.

When the valve 94 is in the position shown by Fig. 2B the conduits 103 and 105 are in register through the chamber around the neck 101 so that the motor 68 is open to pressure through the conduit 105 and the other side of the motor is open to the exhaust range through conduit 104, the end of valve casing 94, the conduit 107 and the exhaust valve 25. The motor 68 is thereby under pressure and tends to rotate in the opposite direction of the arrows 62.

The valve 94 is provided with a piston rod 108 formed with a slot 109 in which is located a pin 110 carried by the one end of a lever 111 the other end of which is provided with a runner 112 which is located in a groove 113 presented by a sleeve 114 mounted for axial movement on the spindle 61 (Figs. 7 and 8). The sleeve 114 is provided with a groove 115 having end portions which lie in planes transverse to the sleeve and an intermediate angled portion between said end portions. A runner 116 carried by the flange 78 of the disc 74 tracks the groove 115.

The sleeve 114 is also provided with a slot or groove 128 in which is located a runner 129 carried by one of the lugs 64 of the spindle 61.

The sleeve 114 is slid axially in one direction or the other when the runner 116 tracks the angled portion of the groove 115 and the sleeve is rotated by means of the runner 129 and slot 128.

The assembly is such that when the runner 116 moves from the position shown by Fig. 2 to the position shown by Fig. 2A to change the gears down, that is, to a slower speed, the valve 94 is not moved. When the valves 24 and 25 have moved to correspond to the new speed position the runner 116 returns to the position shown by Fig. 2. When the runner 116 moves from the position shown by Fig. 2 to the position shown by Fig. 2B, to change the gears up, that is, to a faster speed, the valve 94 is moved to the position shown by Fig. 2B and when the valves 24 and 25 have moved to correspond to the new speed position the runner 116 returns to the position shown by Fig. 2 without moving the valve 94 from the position shown by Fig. 2B.

In order that the power supplied to the engine which drives the epicyclic gearing assembly may be reduced automatically when the speed is moved up there may be incorporated in the secondary or telemotor circuit an automatic decelerator valve, Figs. 2 and 2C, which may include a spring-loaded piston operable in a cylinder 130. Conveniently, the piston is hollow and presents two collars 131 spaced apart by a neck 132 provided with ports 133. A spring 134 located within the piston tends to maintain the piston at an end of the cylinder 130 which is connected to the conduit 105.

The annular wall of the cylinder 130 is provided with spaced grooves or ducts 135 and 136. The groove 135 is connected to the conduit 102 and the groove 136 is connected by a conduit 137 to a cylinder 138 in which is located a spring-loaded piston 139 having a piston rod 140 which is operably connected by a suitable lever and link or other assembly to a valve 141 provided in addition to the usual throttle valve and adapted to control the supply of fuel to the engine. In the case of an electric motor a switch included in the motor circuit is substituted for the valve 141. The groove 136 is also connected to the conduit 102 by means of a conduit 142 provided with a non-return valve 143.

Normally, pressure fluid in conduit 102, which is connected to the inlet valve 24, passes by way of non-return valve 143, conduit 142, groove 136 and conduit 137 to the cylinder 138 whereby the valve or the like 141 is maintained open. When valve 94 is in the position shown by Fig. 2 (to change down) conduit 105 is connected to exhaust side of motor 60 consequently when the pressure in conduit 102 falls during change of gears, valve 143 closes and the pressure in conduit 137 is locked so that valve 141 remains open.

When the direction of rotation of the motor is reversed to change up conduit 105 is supplied with pressure fluid from the conduit 103 and valve 94 (Figs. 2 and 2B) and when pressure in the conduit 102 falls during change of gears valve 143 closes and the piston 131 moves to the position shown by Fig. 2C; in which grooves 135 and 136 are in communication. The spring loading on piston 139 moves the piston rod 140 to close the valve 141 and fluid displaced by the piston 139 passes through conduit 137 and grooves 135 and 136 to conduit 102.

I claim:

1. Control devices for variable speed gearing including a plurality of epicyclic gear trains interconnecting a driving shaft and a driven shaft, a casing mounted for rotation and enclosing said gear trains, cooperative brake components presented respectively by said casing and by the planet carrier of each epicyclic gear train, the said planet carriers being selectively movable axially to effect contact of the brake components carried thereby with the cooperative brake component presented by the casing, means for effecting axial movement of said planet carriers, means presenting a yielding resistance to the rotary movement of the casing, and means operated by the rotary movement of the casing against the said resistance for effecting selection of the planet carrier to be moved axially.

2. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carrier, means presenting a yielding resistance to the tendency of the casing to rotate when clutched by the brake component of a planet carrier, said brakes and resistance being included in a pressure fluid circuit and means automatically actuated by the movement of the casing against the resistance for controlling the pressure fluid in said circuit to effect selection of the brake to be actuated.

3. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, a cylinder carried by said casing, a piston in said cylinder, a load on said piston, a pressure fluid circuit which includes the said brakes and the said cylinder, means for supplying pressure fluid to said circuit, and means automatically actuated by the relative movement of the cylinder and piston for controlling the pressure fluid in said circuit to effect selection of the brake to be actuated.

4. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, a cylinder carried by said casing, a pressure fluid circuit which includes the said brakes and the said cylinder, a piston in said cylinder, a load on said piston constituted by the pressure of the fluid in said circuit operable on one side of said piston modified by a spring operable on the other side of said piston, means for supplying pressure fluid to said circuit, and means automatically actuated by the relative movement of the cylinder and piston for controlling the pressure fluid in said circuit to effect selection of the brake to be actuated.

5. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, means presenting a yielding resistance to the tendency of the casing to rotate when clutched by the brake component of a gear train, said brakes and resistance being included in a pressure fluid circuit, valves for controlling the supply of pressure fluid to said brakes, and means automatically actuated by the rotary movement of the casing against the said resistance for controlling said valves.

6. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, means presenting a yielding resistance to the tendency of the casing to rotate when clutched by the brake component of a gear train, said brakes and resistance being included in a pressure fluid circuit, valves for controlling the supply of pressure fluid to said brakes, a pinion carried by said casing and spaced radially from the center of rotation of said casing and means actuated by said pinion for controlling said valves.

7. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, valves for controlling the supply of pressure fluid to said brakes, a pinion carried by said casing, means for effecting translation of the pinion through an arc the center of which is the center of rotation of the casing, a rack bar for effecting rotation of said pinion, and means operable by the rotation of the pinion for controlling the said valves.

8. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, a cylinder carried by said casing, a pressure fluid circuit which includes the said brakes and the said cylinder, a piston in said cylinder, a load on said piston constituted by the pressure of the fluid in said circuit operable on one side of said piston modified by a spring operable on the other side of said piston, a connecting rod extending from said piston, a link carried by a stationary frame, a bellcrank lever presenting a limb pivotally connected to said connecting rod and a limb pivotally connected to said link, means for supplying pressure fluid to said circuit and means automatically actuated by the relative movement of the cylinder and piston for controlling the pressure fluid in said circuit to effect selection of the brake to be actuated.

9. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, valves for controlling the supply of pressure fluid to said brakes, a rack, and a pinion carried by said casing and in gear with said rack, the said valves being operable by the pinion for effecting selection of the brake to be actuated.

10. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movably axially by pressure fluid to effect contact of the brake components carried thereby with the cooperative brake component presented by the casing, means for supplying pressure fluid for effecting axial movement of said planet carriers, valves for controlling the supply of pressure fluid to said brakes, a pinion carried by the casing, a rack in gear with said pinion, and means for locking the rack against endwise movement, the said valves being operable by the pinion for effecting selection by the brake to be actuated.

11. Control devices for variable speed gearing including a plurality of epicyclic gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, means presenting a yielding resistance to the tendency of the casing to rotate when clutched by the brake component of a gear train, said brakes and resistance being included in a pressure fluid circuit, valves for controlling the supply of pressure fluid to said brakes, means tending to rotate said valves, means for locking said valves against rotation and devices for releasing said valves from said locking means, and means automatically actuated by the movement of the casing against the resistance for operating said locking and releasing devices.

12. Control devices for variable speed gearing including a plurality of gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, means presenting a yielding resistance to the tendency of the casing to rotate when clutched by the brake component of a gear train, said brakes and resistance being included in a main pressure fluid circuit, valves for controlling the supply of pressure fluid to said brakes, a secondary pressure fluid circuit, a motor incorporated in said circuit for imparting to said valves a tendency to rotate, a cam, spaced projections and spaced notches presented by said cam, and a cam follower and locking pin cooperable respectively with said projections and notches.

13. Control devices for variable speed gearing including a plurality of gear trains interconnecting a driving shaft and a driven shaft, a rotatable casing enclosing said gear trains, cooperative brake components presented respectively by said casing and by the planet carrier of each epicyclic gear train, the said planet carriers being selectively movable axially by pressure fluid to effect contact of the brake components carried thereby with the cooperative brake component presented by the casing, means for supplying pressure fluid for effecting axial movement of said planet carriers, means presenting a yielding resistance to the tendency of the casing to rotate when clutched by the brake component of a gear train, said brakes and resistance being included in a main pressure fluid circuit, valves for controlling the supply of pressure fluid to said brakes, a secondary pressure fluid circuit, a motor incorporated in said circuit for imparting to the valves a tendency to rotate, means for automatically locking against rotation and releasing said valves, and a valve included in said secondary circuit and operable by said locking and releasing means for changing the direction of rotation of said motor.

CARL ROBERT HUGO BONN.